United States Patent
Welch

(10) Patent No.: US 9,516,251 B2
(45) Date of Patent: Dec. 6, 2016

(54) METHOD AND APPARATUS FOR DISPLAYING AND ENABLING THE PURCHASE OF PRODUCTS DURING VIDEO PLAYBACK

(75) Inventor: Andrew Welch, Valley Glen, CA (US)

(73) Assignee: GRABIT INTERACTIVE, INC., Valley Glen, CA (US)

( * ) Notice: Subject to any disclaimer, the term of this patent is extended or adjusted under 35 U.S.C. 154(b) by 496 days.

(21) Appl. No.: 11/897,477

(22) Filed: Aug. 30, 2007

(65) Prior Publication Data

US 2008/0098425 A1 Apr. 24, 2008

Related U.S. Application Data

(60) Provisional application No. 60/852,829, filed on Oct. 18, 2006.

(51) Int. Cl.
| | |
|---|---|
| *H04N 5/445* | (2011.01) |
| *H04N 21/254* | (2011.01) |
| *H04N 21/2547* | (2011.01) |
| *H04N 21/44* | (2011.01) |
| *H04N 21/4725* | (2011.01) |
| *H04N 21/478* | (2011.01) |
| *H04N 21/858* | (2011.01) |

(52) U.S. Cl.
CPC ...... *H04N 5/44513* (2013.01); *H04N 21/2542* (2013.01); *H04N 21/2547* (2013.01); *H04N 21/44008* (2013.01); *H04N 21/478* (2013.01); *H04N 21/4725* (2013.01); *H04N 21/47815* (2013.01); *H04N 21/8583* (2013.01)

(58) Field of Classification Search
CPC ............ H04N 21/2542; H04N 21/2547; H04N 21/44008; H04N 21/4725; H04N 21/478; H04N 21/47815; H04N 21/8583; H04N 5/44513
USPC .... 725/22–24, 32–36, 40, 42, 50–53, 60–61
See application file for complete search history.

(56) References Cited

U.S. PATENT DOCUMENTS

| | | | |
|---|---|---|---|
| 7,000,242 B1 * | 2/2006 | Haber .............................. | 725/43 |
| 2002/0080163 A1 * | 6/2002 | Morey .......................... | 345/727 |
| 2002/0120934 A1 * | 8/2002 | Abrahams ....................... | 725/60 |
| 2005/0086690 A1 * | 4/2005 | Gilfix et al. .................... | 725/42 |
| 2006/0230123 A1 * | 10/2006 | Simmons et al. ............ | 709/219 |

* cited by examiner

*Primary Examiner* — Yassin Alata
(74) *Attorney, Agent, or Firm* — Blakely, Sokoloff, Taylor & Zafman LLP

(57) ABSTRACT

A method for obtaining product information and purchasing a product. While viewing images on a video display device, an input device is used to initiate display of a video frame. A product of interest which appears is selected to obtain a display of product information. A portion of the display of product information is selected to initiate a purchase of the product. Also provided is method for identifying a product which appears in a video stream for which product information and possible purchase is desired. A video pixel cluster is selected within a video frame corresponding to the product. The selected pixel cluster is stored in an area definition database. A product identifier is associated with the stored pixel cluster. An interactive video is delivered which includes video frames with product identifiers and corresponding area identifiers. The video stream is transmitted using an internet connection or a smart cable connection.

11 Claims, 5 Drawing Sheets

METHOD AND APPARATUS FOR DISPLAYING AND ENABLING THE PURCHASE OF PRODUCTS DURING VIDEO PLAYBACK

The present patent application is a non-provisional application claiming the priority of a provisional application, Application No. 60/852,829, filed Oct. 18, 2006.

BACKGROUND OF THE INVENTION

Television programming and television commercial advertisements have traditionally been produced with the intent of the viewer watching the content in real time. For example, if a television program is 30 minutes long, including commercials, then the producers and broadcasters of the program have always intended that the viewer view the program in real time, and thus take 30 minutes to do so. Such programs may also be digitized and streamed over a network for playback using a computer with a display.

With the introduction of home videotape recorders it became possible to record a television program with commercials for later playback. Typically such devices also allow the viewer to "fast-forward" through any part of the program, and thus not watch that part of the program. Viewers could use this feature to fast-forward through the commercials that had been broadcast within the program, in order to watch the program without such commercial interruptions. Similarly, with streamed video content, the user is able to "fast-forward" over commercials or the like by using a pointing device to select and drag a video progress icon.

More recently, new technologies have been introduced that are gradually replacing the videotape machine as the means of recording television programs and commercials in the home and elsewhere. One such technology is the Digital Video Recorder that utilizes new digital technologies to allow a viewer to record significant amounts of television programming and store such programming on a hard drive.

In addition to allowing a viewer to more easily record significant amounts of television programming, many of these devices also incorporate other features that are an improvement over earlier videotape technologies. One of these features, typically, allows a viewer to more easily fast-forward through, or "skip" the commercials that were initially broadcast within the program resulting in fewer commercials actually being watched.

Typically, advertisers who use television pay for commercials based upon the number of viewers and/or type of viewers (by demographic breakdown or otherwise) that they believe will ultimately see the commercial.

As such, as more and more viewers gain access to these new technologies, and as more and more of them use these technologies to skip through the commercials, advertisers are less likely to be willing to pay as much as they traditionally have paid.

This may lead to a number of fundamental problems for advertisers, advertising agencies, television networks, cable channels, television producers and others who deliver advertising-supported programming due to reduced advertising revenues.

As can be seen, there is a need for an improved method and system for producing and delivering advertising and sponsorship messages to a television audience, whether by traditional broadcast, satellite or cable, or by streaming video using the Internet.

SUMMARY OF THE INVENTION

The invention is directed to an Internet or television broadcasting interactive system, that:

Allows a user to:

Dynamically identify and select objects (based on video pixel clusters) from video frames, fields, or scenes and trigger playback of recordings (commercials) via a high speed Internet connection or any connection with bi-directional communication using a computer or other hardware configured to work with the invented system;

If a high speed Internet or invention enabled cable connection is available, connect to invented server software or to an Internet web site to access a secure e-Commerce enabled system that allows the user to purchase or obtain information about the identified object contained in the video frame, field, or scene.

Enables a person to:

Encode video frames, fields, or scenes with commands that trigger playback of digital recordings (commercials) for later streaming via a high speed Internet connection using a computer or invention enabled cable connection;

Create links to e-Commerce enabled Internet web sites.

In one embodiment of the invented software a person is able to dynamically interact on a standard TV screen or computer monitor to select commands from the video frame, field, or scene displayed on the screen (standard commercial home use) whose position is determined by the position of his or her finger on a remote handheld touch screen device, the 'X' and 'Y' coordinates created by a standard commercial remote wireless mouse, a keyboard and mouse connected to a computer, or other invention enabled hardware capable of creating 'X' and 'Y' coordinates in video displayed on a monitor or TV screen.

BRIEF DESCRIPTION OF THE DRAWINGS

FIG. 1a shows an original scene and FIG. 1b shows the various items that might be identified within the scene.

FIG. 2b shows the zoomed area representing an area within the rectangle in FIG. 2a.

DETAILED DESCRIPTION OF THE INVENTION

While the invention is mainly directed to a viewer of a television broadcast, certain processing of the video to be broadcast is required. The processing requires that products which appear in the video which are to be the made available to the viewer for possible purchase must be identifiable as such. That is, the viewer must be able to use an input device to make desired product selections among displayed products. Additionally, once a product has been selected, there must be a link to product information which can be viewed by the viewer. Finally, there must be a mechanism to broadcast the video with displayed products and to allow product information to be displayed and a purchase order to be made by the viewer if the viewer desires to make a purchase.

Processing Video—The Selection Process Within a Frame

The processing which takes place requires that areas of a video frame which include a desired product must be identified by area or pixel cluster. A zoom feature can be used to aid the selection process. The identified area is then stored in an area definition database or pixel cluster database. The stored area information is then linked to specific product information provided in a product description database. Further details regarding these steps are set forth below.

Area Selection

Figure 1A:
FIGS. 1a and 1b demonstrates how various items in a scene can be identified with the area selection method.
Figure 1B:

Referring to FIGS. 1a-1b, area selection software lets a technician select a video pixel cluster (also called an area) of a frame with the help of an invented software selector. FIG. 1a shows a video frame prior to processing by the invention. FIG. 1b shows various items in the frame which have been identified by area selection. Although not shown in FIG. 1b, after processing is completed, the area represented by each selection is marked in red or some other color. Assuming that the technician has a mouse or any similar input device, the invented software selector will receive X and Y coordinates which determine the portion of the video frame that the technician wants to select. Logic representing an implementation of this function in pseudo-code form is as follows:

```
FUNCTION SELECT-AREA(X-MOUSE, Y-MOUSE)
BEGIN
AREA-ARRAY[POS].X := X-MOUSE
AREA-ARRAY[POS].Y := Y-MOUSE
SELECT-COLOR(RED)
DRAW-PIXEL(X, Y)
END
```

This function is used to select and draw around the area where an object is located. The selected area can later be used to know whether the marketers and viewers click in the area and thus select it.

To avoid having the technician draw every single pixel around an area, a function to draw a line between the previous click and the next click is used. Also, this function will be used to close the area once finished—draw a line between the very last and very first pixels clicked (the resulting area is a closed polygon). Logic representing an implementation of this function in pseudo-code form is as follows:

```
FUNCTION DRAW-LINE(X1, Y1, X2, Y2)
BEGIN
DISTANCE := SQRT(((X1 - X2) ** 2) + ((Y1 - Y2) ** 2))
XINC := (X2 - X1) / DISTANCE
YINC := (Y2 - Y1) / DISTANCE
WHILE X1 < X2
LOOP
DRAW-PIXEL(X1, Y1)
X1 := X1 + XINC
Y1 := Y1 + YINC
END LOOP
END
```

The invention also automatically searches pixels with similar colors around where the technician clicks to automatically select them. This accelerates the selection process. Logic representing an implementation of this function in pseudo-code form is as follows:

```
FUNCTION FIND-SIMILAR-PIXELS(X, Y, REF-PIXEL)
BEGIN
PIXEL := GET-PIXEL(X, Y)
IF COLOR-DISTANCE(PIXEL, REF-PIXEL) <= MAX_DISTANCE
SELECT-AREA(X, Y)
FIND-SIMILAR-PIXELS(X-1,   Y-1,   REF-PIXEL)
FIND-SIMILAR-PIXELS(X-1,   Y,     REF-PIXEL)
FIND-SIMILAR-PIXELS(X-1,   Y+1,   REF-PIXEL)
FIND-SIMILAR-PIXELS(X,     Y-1,   REF-PIXEL)
FIND-SIMILAR-PIXELS(X,     Y+1,   REF-PIXEL)
FIND-SIMILAR-PIXELS(X+1,   Y-1,   REF-PIXEL)
FIND-SIMILAR-PIXELS(X+1,   Y,     REF-PIXEL)
FIND-SIMILAR-PIXELS(X+1,   Y+1,   REF-PIXEL)
END IF
END
FUNCTION COLOR-DISTANCE(P1, P2)
BEGIN
RETURN SQRT(((P1.RED    - P2.RED)    ** 2) +
((P1.GREEN  - P2.GREEN)  ** 2) +
((P1.BLUE   - P2.BLUE)   ** 2))
END
```

The function to find similar pixels checks pixels around a center pixel. A pixel is considered as part of the area being selected when the distance between the color of the specified pixel and the color of a reference pixel is smaller or equal to MAX-DISTANCE, which is user settable for best selection. The computation of the color distance between two pixel colors is the square root of the sum of the squares of the differences between each color component.

Pixel Cluster Selection

In Pixel Cluster Selection mode, the technician will click and hold the mouse button on a corner of the desired area, drag the mouse to the opposite corner, and release the button. This will identify a rectangular target area that is then tested for uniqueness within that particular frame of the video being displayed. If the area is not unique, the user will be shown a message to that effect and the selection is voided. Logic representing an implementation of this function in pseudo-code form is as follows:

```
FUNCTION SELECT-PIXEL-CLUSTER(X-MOUSE, Y-MOUSE)
BEGIN
CLUSTER-ARRAY[POS].X1 := X-MOUSE
CLUSTER-ARRAY[POS].Y1 := Y-MOUSE
WHILE MOUSE-BUTTON-PRESSED
LOOP
END LOOP
CLUSTER-ARRAY[POS].X2 := X-MOUSE
CLUSTER-ARRAY[POS].Y2 := Y-MOUSE
X-SIZE := CLUSTER-ARRAY[POS].X2 - CLUSTER-ARRAY[POS].X1
Y-SIZE := CLUSTER-ARRAY[POS].Y2 - CLUSTER-ARRAY[POS].Y1
UNIQUE := TRUE
FOR X-INDEX := 1 TO WINDOW-X-SIZE
LOOP
FOR X := 1 TO X-SIZE
LOOP
FOR Y-INDEX := 1 TO WINDOW-Y-SIZE
LOOP
FOR Y := 1 TO Y-SIZE
LOOP
PIXEL1 := GET-PIXEL(X-INDEX, Y-INDEX)
PIXEL2 := GET-PIXEL(X, Y)
IF PIXEL1 EQUALS PIXEL2 THEN
UNIQUE = FALSE
END
END IF
END LOOP
END LOOP
END LOOP
END LOOP
END
```

Zoom Feature

Figure 2A:
FIG. 2a shows an original scene with an area to be expanded by a zoom function.
Figure 2B:
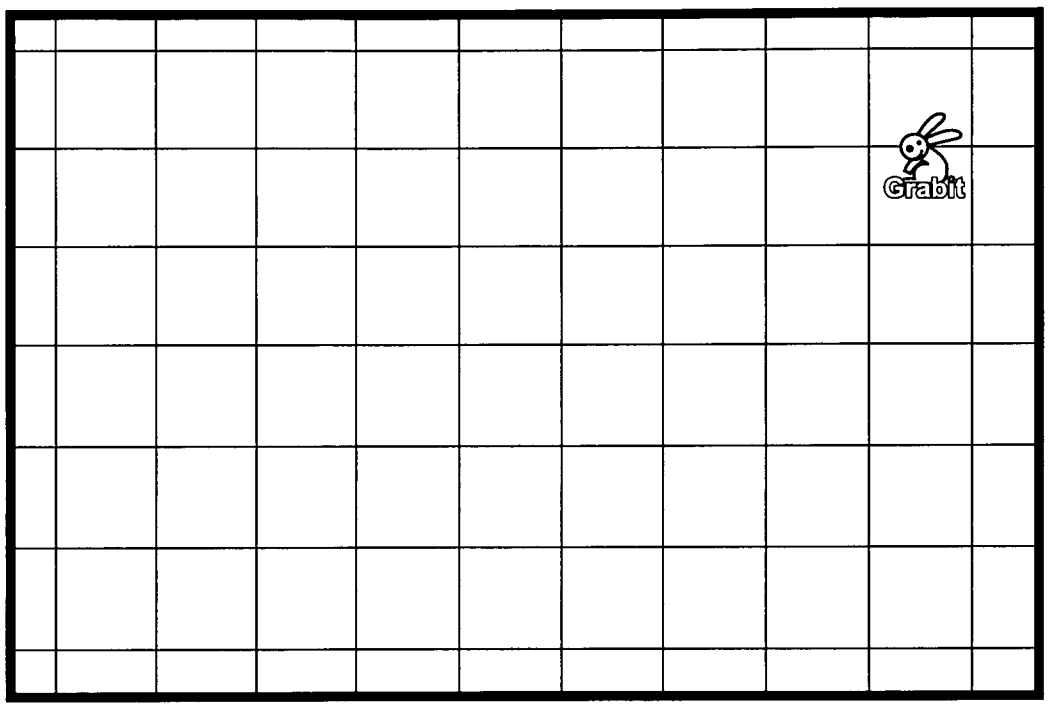

To help the technician in selecting the proper pixels, with reference to FIGS. 2a and 2b, the software offers a zoom feature. The zoom feature is used to render one single pixel from the source video frame to a larger pixel on the technician display. This is achieved by rendering a small square on the display to represent that pixel. Logic representing an implementation of this function in pseudo-code form is as follows:

```
FUNCTION DRAW-SQUARE(X, Y, COLOR, ZOOM-FACTOR)
BEGIN
   SELECT-COLOR(COLOR)
   X := X * ZOOM-FACTOR
   Y := Y * ZOOM-FACTOR
   FOR I := 1 TO ZOOM-FACTOR
   LOOP
      FOR J := 1 TO ZOOM-FACTOR
      LOOP
         DRAW-PIXEL(X + I, Y + J)
      END LOOP
   END LOOP
END
```

Some clipping will be necessary in order to avoid drawing outside of the screen. This is usually accomplished before calling the DRAW-SQUARE function so only the part of the image visible on the screen is rendered.

Figure 2C:
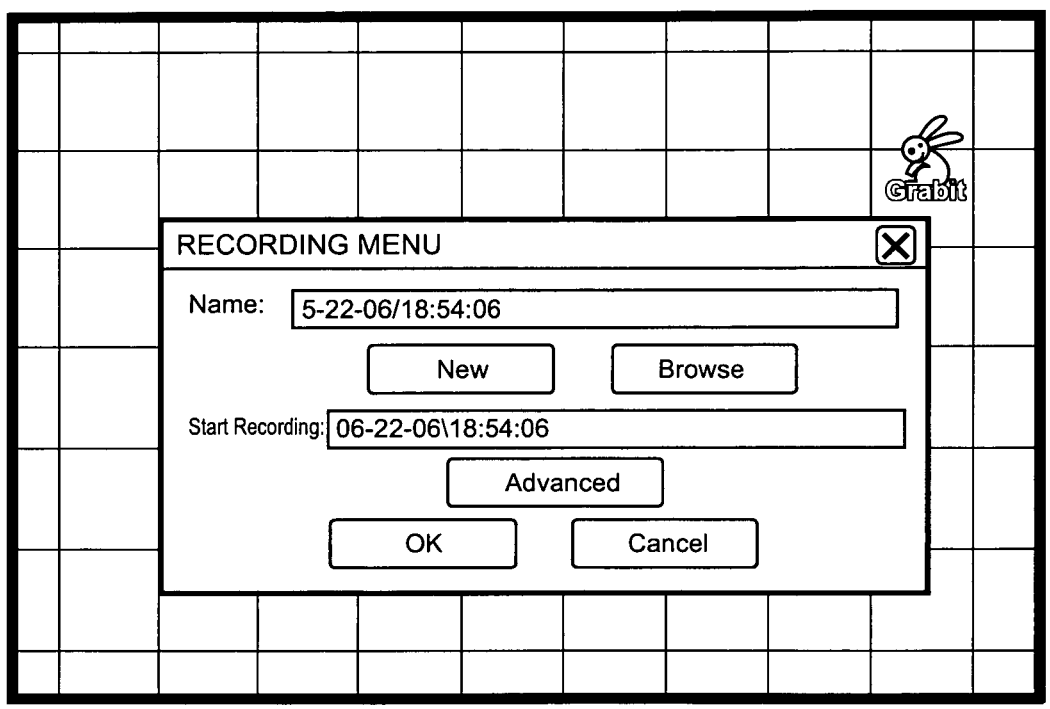
FIG. 2c shows a displayed dialog box.

FIG. 2a shows a rectangle surrounding a bracelet being worn by an actress. The rectangle is drawn by the zooming functionality and the figure represents one of, possibly, several zoom selections that allow the technician to fine tune the selection. FIG. 2b shows the resulting pixel cluster selection produced by the, possibly repetitive, zoom operations. Once the technician is satisfied that the portion of the screen representing the desired item to be processed is properly represented by the pixels shown in FIG. 2b, a dialog box as shown in FIG. 2c is displayed. The manner in which this dialog box is used by the invention is explained below in Storing Pixel Cluster Selection.

Once the image has been zoomed on the screen, it is necessary to take the zoom factor in account whenever there is a click to select an area (i.e. add X:=X-MOUSE/ZOOM-FACTOR in the SELECT-AREA function)

The zoom feature also requires that the technician move the area left and right, top and bottom in order to see the entire image and not just a corner. This adds two more variables: X-OFFSET and Y-OFFSET. When drawing, these offsets are subtracted from the X and Y parameters; and when receiving, these offsets are added to the X and Y parameters.

Overall Selection Functionality

These functions can be combined to provide the technician with several methods of selecting an area and then save it. Area selection can operate in either the SELECT-POLYGON-AREA or the SELECT-PIXEL-AREA mode. The desired mode will be selectable via a user interface menu or mouse right-click menu. These menu's will also allow the user to select and set a zoom area and/or save the current state of the AREA-ARRAY. The logic for the SELECT-POLYGON-AREA in pseudo-code form is as follows:

```
FUNCTION SELECT-POLYGON-AREA
   POLYGON-COMPLETE := FALSE
   PREV-X := FIRST-X := -1
   PREV-Y := FIRST-Y := -1
   WHILE NOT POLYGON-COMPLETE
      IF MOUSE-SINGLE-CLICKED
         IF (PREV-X = -1) AND (PREV-Y = -1)
            ADD-VERTEX(X, Y)
            PREV-X := X-MOUSE
            PREV-Y := Y-MOUSE
            FIRST-X := X-MOUSE
            FIRST-Y := Y-MOUSE
         ELSE
            ADD-VERTEX(X, Y)
            DRAW-LINE(PREV-X, PREV-Y, X, Y)
            PREV-X := X-MOUSE
            PREV-Y := Y-MOUSE
         END IF
      END IF
      IF MOUSE-MOVED
         ADD-VERTEX(X-MOUSE, Y-MOUSE)
         DRAW-LINE(PREV-X, PREV-Y, X, Y)
         PREV-X := X-MOUSE
         PREV-Y := Y-MOUSE
      END IF
      IF MOUSE-DOUBLE-CLICKED
         DRAW-LINE(PREV-X, PREV-Y, FIRST-X, FIRST-Y)
         POLYGON-COMPLETE := TRUE
      END IF
```

The method for selecting an area via a pixel cluster is the same as in Section 2-Pixel Cluster Selection above.

Therefore, the overall selection area functionality in pseudo-code form is as follows:

```
FUNCTION SELECT-AREA
   IF SELECT-POLYGON-AREA-MODE
      SELECT-POLYGON-AREA
   ELSE IF SELECT-PIXEL-AREA-MODE
      SELECT-PIXEL-AREA
   END IF
END
```

Storing Area Definitions

Once a technician is finished drawing an area boundary, the invented software fills the area. The result is a red or other color blob or cluster of video pixels. The technician can continue to work on the edges of the area until satisfied. Once the cluster of pixels is determined to be a unique and identifiable cluster of pixels in the field or frame of video, it is saved in an Area Definition Database. Logic representing an implementation of this function in pseudo-code form is as follows:

```
FUNCTION SAVE-AREA(AREA-ARRAY)
BEGIN
   IMAGE-NUMBER := IMAGE-NUMBER + 1
   AREA-IDENTIFIER := "IMAGE" + IMAGE-NUMBER
   AREA-DEFINITION := ""
   FOR-EACH PIXEL IN AREA-ARRAY
      AREA-DEFINITION := AREA-DEFINITION +
      " " + PIXEL.X + PIXEL.Y
   END FOR
   INSERT INTO AREA-TABLE (IDENTIFIER, AREA)
   VALUES (AREA-IDENTIFIER, AREA-DEFINITION)
END
```

The SAVE-AREA function constructs a string whose content is a space separated list of pixel coordinates representing the selection area. Before creation of the area definition (AREA-DEFINITION) in the database, it is given a unique identifier (AREA-IDENTIFIER) that will be used to link the area definition with the associated product. The Area Definition Database (referred to above as the AREA-TABLE) contains two fields, IDENTIFIER and AREA. The two values, AREA-IDENTIFIER and AREA-DEFINITION added to the AREA-TABLE using a simple SQL statement.

Area Definitions would typically be used to define large and easily enclosed areas such as household furnishings, automobiles, clothing, plants, and so forth.

Storing Pixel Cluster Definitions

When the technician has finished selecting pixel clusters and it is determined that the cluster of pixels is a unique and identifiable cluster of pixels in the field or frame of video, they are saved in a Pixel Cluster Definition Database. Referring to FIGS. 2a and 2b, note that FIG. 2a shows the original scene with an area having a rectangle. The rectangle represents an area of the field or frame of video that is selected for a zoom operation. The resulting selection area is then displayed to the technician as a large graphic covering the same area as the original field or frame of video. By repeating this process, the technician can further refine the area of interest. FIG. 2b shows the resulting pixel cluster selection attained by the zooming operation(s). FIG. 2c is that same pixel cluster selection with the dialog box that allows the technician to supply the data required for storing the definition. Logic representing an implementation of this function in pseudo-code form is as follows:

```
FUNCTION SAVE-CLUSTERS(CLUSTER-ARRAY)
BEGIN
  FOR-EACH CLUSTER IN CLUSTER-ARRAY
    CLUSTER-NUMBER := CLUSTER-NUMBER + 1
    CLUSTER-IDENTIFIER := "CLUSTER" + CLUSTER-NUMBER
    CLUSTER-DEFINITION := ""
    FOR-EACH PIXEL IN CLUSTER
      CLUSTER-DEFINITION = CLUSTER-DEFINITION +
      " " + PIXEL.RED + ","
      + PIXEL.BLUE + ","
      + PIXEL.GREEN
    END FOR
  END FOR
  INSERT INTO CLUSTER-TABLE (IDENTIFIER, CLUSTER)
  VALUES (CLUSTER-IDENTIFIER, CLUSTER-DEFINITION)
END
```

The SAVE-CLUSTER function constructs a string whose content is a space separated list of pixel color values representing the pixel cluster area. Before creation of the cluster definition (CLUSTER-DEFINITION) in the database, it is given a unique identifier (CLUSTER-IDENTIFIER) that will be used to link the cluster definition with the associated product. A Cluster Definition Database (referred to above as the CLUSTER-TABLE) contains two fields, IDENTIFIER and AREA. The two values, CLUSTER-IDENTIFIER and CLUSTER-DEFINITION added to the CLUSTER-TABLE using a simple SQL statement.

Pixel Cluster Definitions would be used where it is more difficult to enclose an item or where the same item might appear in several frames of the presentation. These items would include things such as watches, rings, necklaces, bracelets, small articles of clothing, and so forth.

Linking to Product Information

Defining a Product

The definition of each product is found in the Product Description Database (referred to below as the PRODUCT-TABLE) and it includes information such as the name, quantity available, the price, the colors and sizes, the manufacturer, video clips of different quality to satisfy different Internet connections and more.

A marketer of a product is responsible for entering the product information into the Product Description Database. This can be done within a web page on the Internet. The web page offers a set of fields where the marketer can enter the different information necessary to describe the product, including a thumbnail picture of the product. Once the marketer clicks on an OK button, the INSERT-PRODUCT function is called with all the information gathered. Logic representing an implementation of this function in pseudo-code form is as follows:

```
FUNCTION INSERT-PRODUCT(NAME, QUANTITY, PRICE, COLOR,
MANUFACTURER, CLIP-NAME, THUMBNAIL)
BEGIN
  PRODUCT-IDENTIFIER := PRODUCT-IDENTIFIER + 1
  INSERT INTO PRODUCT-TABLE (PRODUCT-ID, PRODUCT-NAME,
  PICTURE, QUANTITY, UNIT-PRICE, COLOR,
  MANUFACTURER-NAME, VIDEO-CLIP)
  VALUES (PRODUCT-IDENTIFIER, NAME, THUMBNAIL,
  QUANTITY, PRICE, COLOR, MANUFACTURER, CLIP-NAME)
END
```

Note: this function shows how to insert certain elements in the database. It does not show all the possible elements.

Before insertion of the product in the database, it is given a unique number called a PRODUCT-IDENTIFIER that will be used to link the product with an associated area definition. The various fields describing the product are put into the Product Description Database using a simple SQL statement.

Attaching the Product to an Area or Pixel Cluster

Once a marketer has inserted a new product, he can then search for available areas and pixel colors in different video frames. By clicking on an area or pixel cluster, the marketer assigns them to the product.

The result is a table linking products and areas together. Logic representing an implementation of this function in pseudo-code form is as follows:

```
FUNCTION LINK-PRODUCT-TO-AREA(PRODUCT-IDENTIFIER,
AREA-IDENTIFIER)
BEGIN
  INSERT INTO LINK (PRODUCT-IDENTIFIER, AREA-IDENTIFIER)
  VALUES (PRODUCT-IDENTIFIER, AREA-IDENTIFIER)
END
FUNCTION LINK-PRODUCT-TO-CLUSTER(PRODUCT-IDENTIFIER,
CLUSTER-IDENTIFIER)
BEGIN
  INSERT INTO LINK (PRODUCT-IDENTIFIER, CLUSTER-
  IDENTIFIER)
  VALUES (PRODUCT-IDENTIFIER, CLUSTER-IDENTIFIER)
END
```

There may be more than one link for each product as the same product may be identified in more than one scene or with one or more pixel clusters. Once this is done for each product and area or pixel cluster available in a video, the invented system is ready to be delivered.

Broadcasting (Server Administrator)

Once areas within video frames containing products have been identified, and product information has been linked to the products which appear in the video frames, the video is ready to be delivered to end users.

Overview of Server Software

The invented server software may add a logo in a corner of the video frame to inform the viewer that one or more products visible in the video can be purchased using the invented system. The application of the logo to a selected scene is done during processing phase by the technician defining the Area and Pixel Cluster Selection process.

The invented server software optionally adds a sound effect to let viewers know that a frame with products for purchase is approaching.

Internet Connection

Using available technologies (such as MPEG, Flash, Windows Media, QuickTime, etc.), the invented server software is used to broadcast to the viewer and is displayed on a computer monitor using the appropriate viewer in a web page. In this case, the invented server Software will operate interactively with the viewer using a standard commercial remote wireless mouse, a keyboard and mouse connected to a computer, or other hardware enabled for use with the invention capable of creating 'X' and 'Y' coordinates in video displayed on a monitor.

Smart Cable Connection

Using technology based on the intelligent set-top boxes (with bi-directional communication), the server software is used to broadcast the product enabled video as a video stream to the viewer and is displayed on television screen the same as non enabled video. In this case, the server software will operate interactively with the viewer using a vendor supplied remote control or other invention enabled hardware enabled for use with the invention capable of creating 'X' and 'Y' coordinates in video displayed on a television screen.

Other Connections

Current television broadcasting (not cable connected or cable connected using a dumb set-top box) as well as program content delivery via Compact Disk (CD), Digital Versatile Disk (DVD), Personal Data Assistant (PDA), or other handheld computing devices pose a problem in that there is no bi-directional communication and, therefore, no existing way for the viewer's actions to be communicated back to the invented server software. In this case, with appropriate hardware changes to the display systems (standard television, component television systems, etc), the broadcast could include the Area Definition Database, Product Definition Database, and the link table at the beginning of the program. This information could be encoded as part of the video's vertical sync in the vertical blanking interval. Once the database information has been transmitted, the local hardware will be responsible for decoding the information in the vertical blanking interval and hosting the invented server software which will be responsible for handling the viewer's inputs and displaying the results much the same as it would be done via an Internet or cable connection. In the case of recorded media (e.g. CD and DVD media), the information would be stored in a file separate from the video and is accessed by a local version of the server software. The primary difference is that the invented server software would produce an on-screen list of the viewer's purchase desires or a printed list if the hardware is so equipped. In this mode of operation, the broadcast video cannot be stopped or delayed so viewer selects an object on the screen via a wireless mouse or touch screen system. The invented server software will utilize the 'Review Later' mechanism described below.

Viewers Experience (Viewers)

Logo and Sound Effect

Figure 3A:
FIG. 3a shows the scene shown in FIG. 1a as the viewer will see it (with the invented software's logo placed in the lower right corner).

As shown in FIG. 3a, the invented software enabled server displays in each frame the above-described logo if the invented software is enabled and/or whenever a desired displayed product is available for purchase to alert the viewer at appropriate times. The logo may appear e.g., approximately 5 seconds before and removed approximately 5 seconds after the product display segment.

Unless the viewer turns off the feature, the invention may automatically play a sound effect when approaching the frames with selectable products as defined in above. Logic representing an implementation of this function in pseudo-code form is as follows:

```
FUNCTION STREAMING( )
BEGIN
IF CURRENT-FRAME + TIME-AFTER <= NEXT-GRABIT-FRAME
AND CURRENT-FRAME − TIME-BEFORE >= NEXT-GRABIT-
FRAME THEN
SET-GRABIT-LOGO-VISIBLE(TRUE)
DRAW-GRABIT-LOGO( )
IF USER-WANTS-AUDIO THEN
ADD-GRABIT-SOUND-EFFECT( )
END IF
ELSE
SET-GRABIT-LOGO-VISIBLE(FALSE)
END IF
SEND-FRAME-TO-VIEWER( )
END
```

Product Selection Methods

The viewer can watch videos processed by the invented software enabled server on their computer or their television screen or any invented video display device. Control in a computer environment will be via a computer keyboard and mouse. When the viewer is connected via cable or satellite using an invention enabled set top box, control will be via the satellite or cable remote control. When the viewer is connected via satellite or cable using an invention enabled television or component set, control will be via the unit's remote control or a standard commercially available remote wireless mouse.

The invention can operate in one of two viewer selectable modes: 'stop for selection' and 'review later'.

Stop for Selection

In the 'stop for selection' mode, when the viewer is interested in a product visible in the video, the viewer can click anywhere on the screen to go to the closest frame used by the invention. Logic representing an implementation of this function in pseudo-code form is as follows:

```
FUNCTION CLICK(X, Y)
BEGIN
IF STOP-FOR-SELECTION
    IF GRABIT-LOGO-VISIBLE THEN
        STOP-STREAMING( )
        SEEK-VIDEO(CLOSEST-GRABIT-FRAME)
        WAIT-FOR-VIEWER-SELECTION( )
    END IF
    CONTINUE PLAYING THE VIDEO STREAM
ELSE
    PROCESS PIXEL CLUSTER EVENT (see below)
END IF
END
```

Note that the STOP-STREAMING( ) and SEEK-VIDEO( ) functions will send messages to the invented software enabled server which controls what the viewer sees.

This moves the video stream to the specific frame the technician used to draw selection areas as described above.

b) Review Later

In the 'review later' mode, when the viewer is interested in a product he sees in the video, he can click on that product. The invented software will record the X and Y coordinates of the click and the information necessary to find that particular frame again. At the end of the video or when the viewer requests, the invented software will present the user with a thumbnail list of each frame clicked on. The viewer then selects a thumbnail to view and shop from. If the selected frame is within an invention enhanced section of the video, operation proceeds as above. The invented software endeavors to treat every click as a "pixel cluster" event. Logic representing an implementation of this function in pseudo-code form is as follows:

```
FUNCTION CLICK(X, Y)
BEGIN
IF STOP-FOR-SELECTION
PROCESS STOP-FOR-SELECTION EVENT (see above)
ELSE
CLUSTER-LIST[POS].X := X
CLUSTER-LIST[POS].Y := Y
CLUSTER-LIST[POS].FRAME := FRAME_TIME
END IF
OTHERWISE CONTINUE PLAYING THE VIDEO STREAM
END
```

The invented software will process "pixel cluster" events by comparing the pixel cluster at the viewer's click point with those in the CLUSTER-TABLE. If a high confidence match is found, the invented Software proceeds to Product Selection using the appropriate video frame.

Product Selection

Once a video frame is selected, the viewer can select a product by clicking on it. The x and y coordinates of the clicks are sent to the invented server software for analysis. Logic representing an implementation of this function in pseudo-code form is as follows:

```
FUNCTION CLICK-PRODUCT(X, Y)
BEGIN
FOR-EACH AREA IN FRAME
IF IN-AREA(AREA, X, Y) THEN
DISPLAY-PRODUCT-INFO(AREA)
EXIT LOOP
END IF
END IF
END
FUNCTION IN-AREA(AREA, X, Y)
BEGIN
ASSUMING THE AREA WAS RENDERED IN RED IN AN OVERLAY
PIXEL := READ-PIXEL(AREA.OVERLAY, X, Y)
RETURN PIXEL IS RED
END
```

The IN-AREA( ) function can be implemented in different ways. The easiest is to render the area using a red color in an overlay and then test whether the pixel at coordinates x and y is red. The overlay is never shown to the viewers.

The IN-AREA( ) function returns true when the viewer clicked on the product attached to that area-product assumed to be visible in the video frame. Then the area identifier is used to determine the product information using two SQL queries. The first query is used to find the product identifier and the second query is used to read the necessary product information. Logic representing an implementation of this function in pseudo-code form is as follows:

```
FUNCTION FIND-PRODUCT(AREA)
BEGIN
---FIRST, FIND THE LINK BETWEEN AREA AND PRODUCT
SELECT PRODUCT-IDENTIFIER AS PROD-ID FROM LINK
WHERE AREA-IDENTIFIER = IDENTIFIER-OF(AREA)
---NOW RETRIEVE THE PRODUCT INFORMATION
SELECT * FROM PRODUCT-TABLE
WHERE PRODUCT-IDENTIFIER = PROD-ID
RETURN RESULTS OF THE 2ND SELECT
END
```

The results of the second SQL command are all the information entered by the marketer as described above. This is then sent back to the viewer for display on his video screen.

Alternate Product Selection Methodology

Figure 3B:
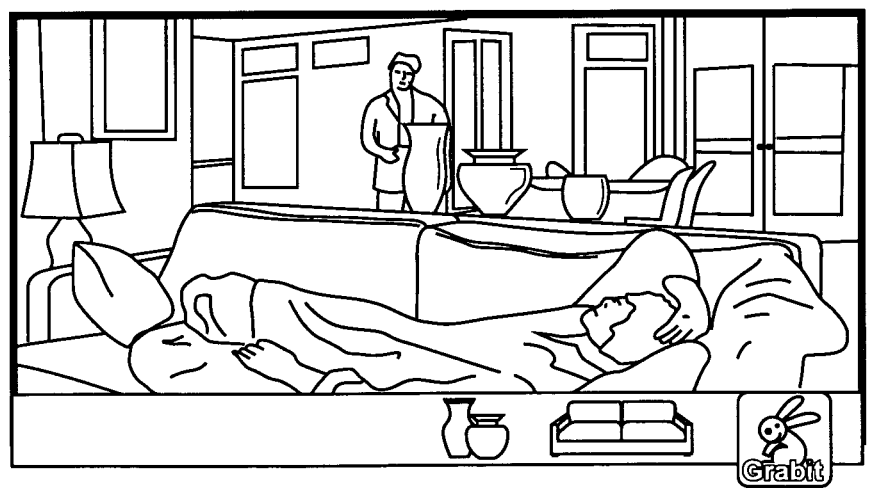
FIG. 3b shows one possible screen shown to the viewer when the viewer has clicked on the scene.

The viewer can set a preference such that the invented server software will also display a banner across the bottom of the screen, as shown in FIG. 3b, that displays thumbnail pictures of the product items available in that frame or any product chosen to be displayed using invented software. The viewer can then click on the appropriate thumbnail to identify the product to be purchased as described above. The viewer can display the banner and/or products at their discretion using the invented software.

Purchase Via Internet or Smart Cable

Whenever the viewer is ready to purchase the merchandise, the viewer clicks on a BUY button on the display and is taken to the secure screen of the invented server software provider and asked to enter credit card information or use the card information already on file. Logic representing an implementation of this function in pseudo-code form is as follows:

```
FUNCTION CLICK(X, Y)
BEGIN
IF CLICKED-ON-BUY-BUTTON(X, Y) THEN
DOCUMENT.LOCATION := PRODUCT.MANUFACTURER.URL;
END IF
END
```

Purchase Via Invention Enabled Hardware

Whenever the viewer is ready to purchase the merchandise, the viewer clicks on the BUY button and the invented server software records the purchase intent in an internal list that can be displayed or printed at a later time by the viewer. This list will contain contact information for mail and/or telephone access to the seller or sellers.

Continue

Once a viewer is done browsing and purchasing the products offered on a video frame, the viewer needs a way to continue playing the video. A button is always available for this purpose. A simple click on that button restarts the main video streaming. Logic representing an implementation of this function in pseudo-code form is as follows:

```
FUNCTION CLICK(X, Y)
BEGIN
IF CLICKED-ON-CONTINUE-BUTTON(X, Y) THEN
START-STREAMING( )
END IF
END
```

Details regarding the actual purchase process are not important for an understanding of the invention and, therefore are not detailed herein. As noted above, there are four separate systems which operate in conjunction with the invention. The first system is processing of a video to identify products displayed. The second system is to link product information with the identified products. The third system is to deliver the video with the identified and linked products. The fourth system is the user interface to enable a viewer to select an identified product and obtain product information and/or make a purchase of the selected product. While the systems are interrelated, they operate independently as indicated in the following claims.

I claim:

1. A method for identifying a product which appears in a video stream comprising:
   a) playing said video stream on a video playback device:
   b) stopping said playing to display a single video frame;
   c) selecting a video pixel cluster within a video frame corresponding to said product, said video pixel cluster being a unique and identifiable cluster of pixels in said predetermined video frame which uniquely represent a specific product in said predetermined video frame, said selecting including searching for pixels with a similar color around a center pixel, said similar color being a color which is within a predetermined color distance of a color of said center pixel;
   d) marking said selected video pixel cluster using a predetermined color and making adjustments to said selected video pixel cluster to ensure that the selected video pixel cluster is a unique and identifiable cluster of pixels in said predetermined video frame;
   wherein said selected video pixel cluster corresponds to an image of a product which appears in said video stream, and forms a portion of said image of the product as displayed;
   e) after said marking, displaying a dialog box for supplying data required for storing said video pixel cluster;
   f) after said displaying, storing said video pixel cluster in an area definition database representing the selected video pixel cluster, said video pixel cluster being stored using a unique identifier;
   g) associating a product identifier with said stored video pixel cluster for subsequently enabling a viewer of said video stream to identify said product during a subsequent playback of said video stream by said viewer.

2. The method defined by claim 1 further comprising linking said identified product to corresponding product information.

3. The method defined by claim 2 wherein said linking comprises:
   a) associating said product identifier with predetermined product information;
   b) creating a link between said product identifier and said stored video pixel cluster.

4. The method defined by claim 1 wherein said selecting comprises using an input device to identify a portion of a video frame containing said product by drawing an area around said product.

5. The method defined by claim 1 wherein said selecting comprises using an input device to identify a portion of a video frame containing said product by creating a multi-sided area corresponding to a desired portion of said video frame.

6. A method for delivering an interactive video processed according to the method defined by claim 1 comprising:
   a) obtaining a video stream including said product which appears in said video stream;
   b) transmitting said obtained video stream using one of an internet connection and a smart cable connection.

7. A method for delivering an interactive video processed according to the method defined by claim 1 comprising:
   a) obtaining a video stream including said product which appears in said video stream;
   b) transmitting said obtained video stream using a unidirectional cable or satellite connection wherein said product identifiers and corresponding area identifiers are contained within a vertical blanking interval.

8. A method for delivering an interactive video processed according to the method defined by claim 1 comprising:
   a) obtaining a video stream including said product which appears in said video stream;
   b) delivering said obtained video stream using recorded media wherein said product identifiers and corresponding area identifiers are contained within a separate data file recorded on the media.

9. A method for identifying a product which appears in a video stream comprising:
   a) playing said video stream on a video playback device:
   b) stopping said playing to display a single video frame;
   c) selecting a video pixel cluster within a video frame corresponding to said product, said video pixel cluster being a unique and identifiable cluster of pixels in said predetermined video frame which uniquely represent a specific product in said predetermined video frame, said selecting including rendering a single pixel from the video frame to a larger pixel on a display to enable a fine tuning of said selecting;
   d) marking said selected video pixel cluster using a predetermined color;
   wherein said selected video pixel cluster corresponds to an image of a product which appears in said video stream, and forms a portion of said image of the product as displayed;
   e) after said marking, displaying a dialog box for supplying data required for storing said video pixel cluster
   f) after said displaying, storing said video pixel cluster in an area definition database representing the selected video pixel cluster, said video pixel cluster being stored using a unique identifier;
   g) associating a product identifier with said stored video pixel cluster for subsequently enabling a viewer of said video stream to identify said product during a subsequent playback of said video stream by said viewer.

10. The method defined by claim 9 further comprising linking said identified product to corresponding product information.

11. The method defined by claim 10 wherein said linking comprises:
    a) associating said product identifier with predetermined product information;
    b) creating a link between said product identifier and said stored video pixel cluster.

* * * * *